Oct. 22, 1957     G. P. RANSOM     2,810,462
SELF-ACTUATING CLUTCH MECHANISM

Filed Nov. 19, 1953     3 Sheets-Sheet 1

INVENTOR
George P. Ransom
BY
C. F. Dibbe
ATTORNEY

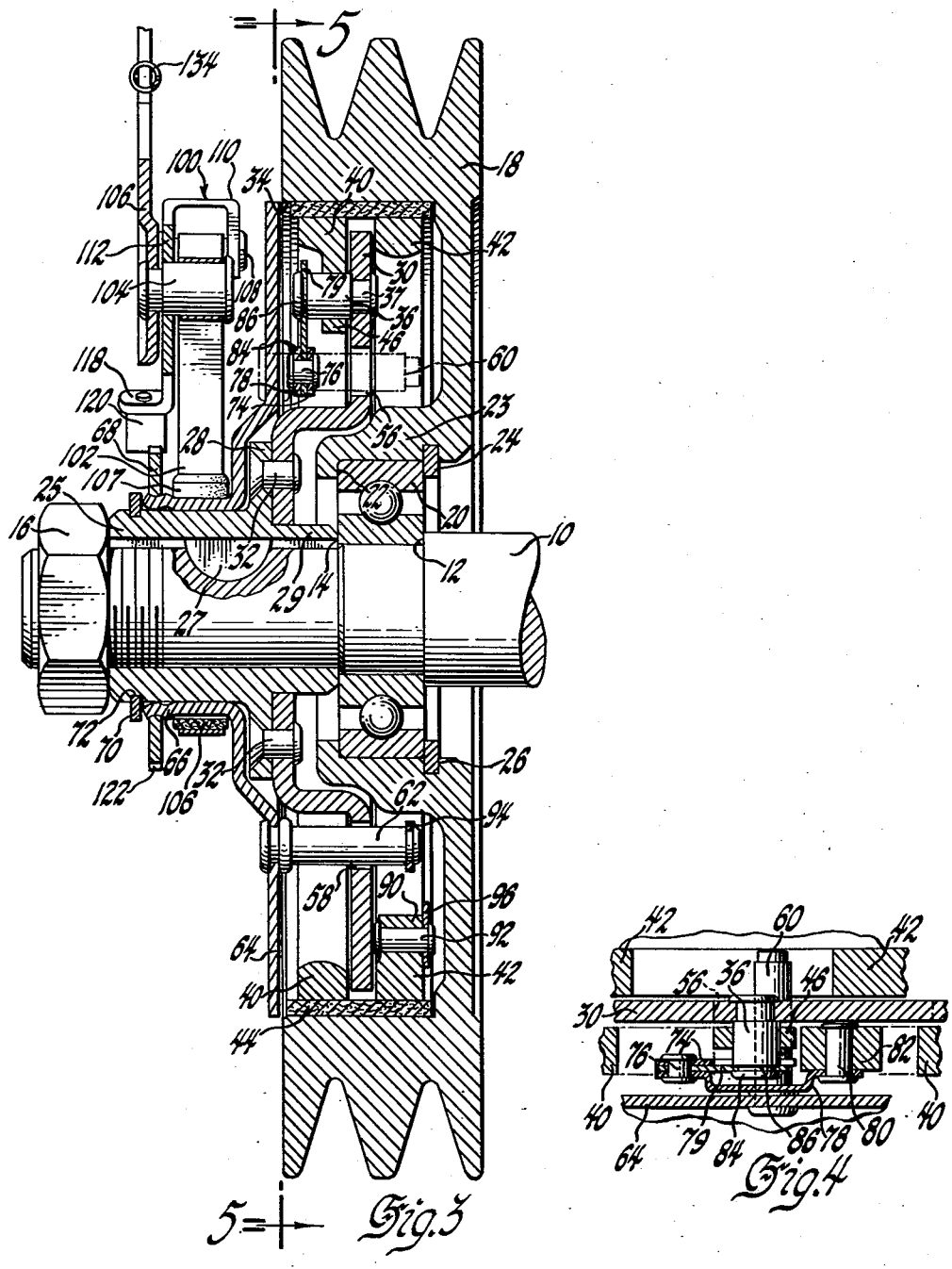

Oct. 22, 1957 G. P. RANSOM 2,810,462
SELF-ACTUATING CLUTCH MECHANISM
Filed Nov. 19, 1953 3 Sheets-Sheet 3

INVENTOR
George P. Ransom
BY
C. F. Dibble
ATTORNEY

United States Patent Office 2,810,462
Patented Oct. 22, 1957

2,810,462

SELF-ACTUATING CLUTCH MECHANISM

George P. Ransom, Berkley, Mich., assignor to General Motors Corporation, Detroit, Mich., a corporation of Delaware Application November 19, 1953, Serial No. 393,042

13 Claims. (Cl. 192—36)

This invention relates to clutch mechanisms and more particularly to friction clutch mechanisms of a self-actuating type for transmitting power from one member to another in one direction of rotation.

In many power-driven installations a need exists for a compact, reliable, effective, low-cost and uni-directional drive clutch which may easily be brought into and out of driving engagement by motion of a control member which initiates self-actuation of the clutch. A clutch mechanism of this type is particularly useful in connection with an automotive air-conditioning compressor drive as one example of its many possible applications.

It is an object of the present invention to provide an improved clutch mechanism which is self-actuating.

Another object of the invention is to provide a clutch mechanism of compact design requiring a minimum of machining in its manufacture.

A further object is to provide an improved uni-directional clutch drive mechanism in the use of which the driving and driven members may be reversed in function if desired.

A feature of the invention resides in the combination with a clutch mechanism of brake means with a trip means arranged to initiate the self-actuation of the clutch mechanism to engage or disengage the same.

These and other important features of the invention will now be described in detail in the specification and pointed out more particularly in the appended claims.

In the drawings,

Fig. 3 is a sectional view taken along the line 3—3 of Fig. 1 but with the parts positioned for clutch engagement;

Fig. 4 is a sectional view taken along the line 4—4 of Fig. 6;

Figures 1, 2:
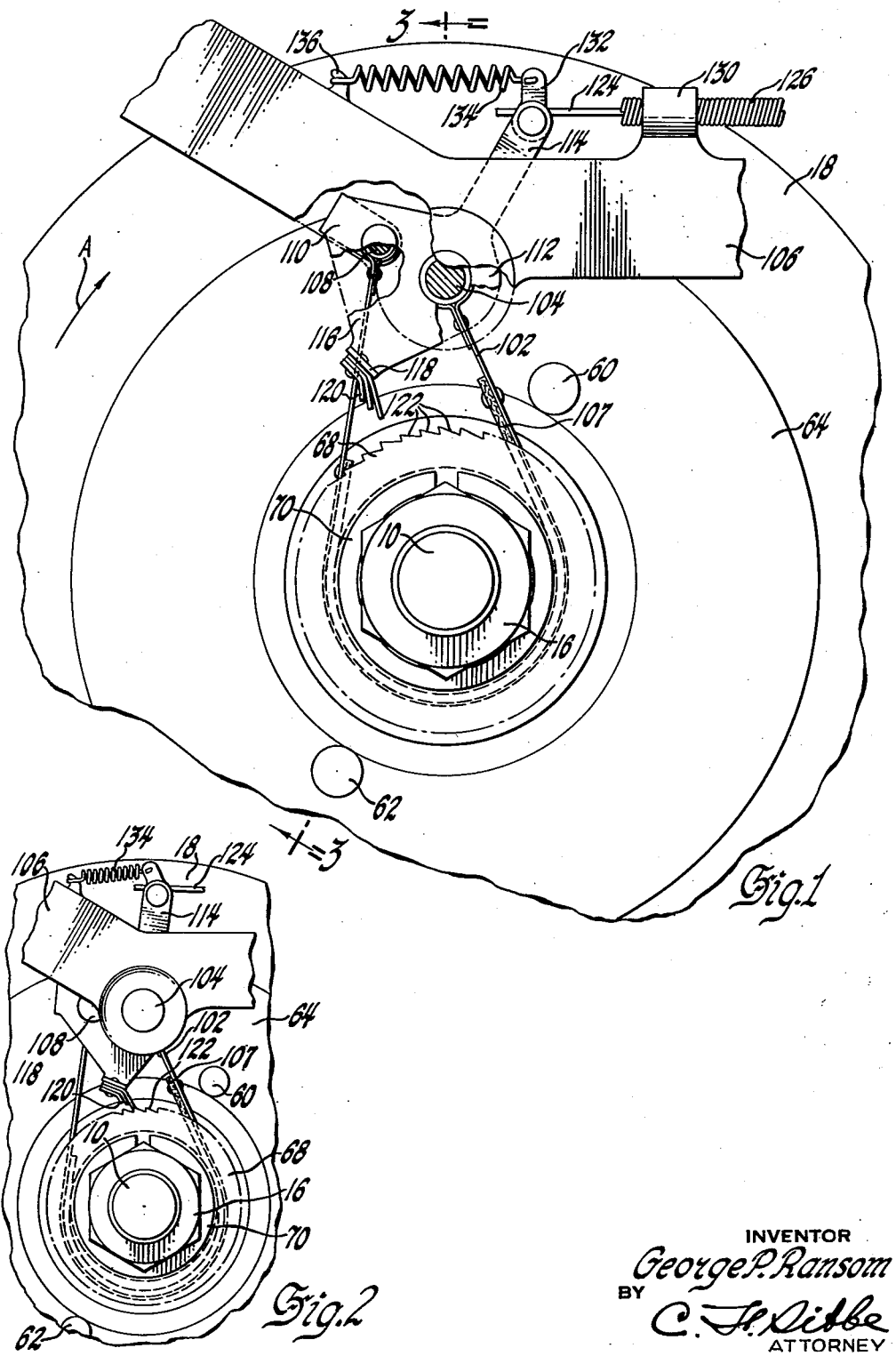
Fig. 1 is a partial and elevational view of a clutch while disengaged and embodying features of the present invention, parts being broken away better to illustrate the construction.
Fig. 2 is an elevational and partial view of parts shown in Fig. 1 but with certain parts relatively positioned to secure clutch engagement, this view being drawn to a smaller scale.

In the drawings the invention is illustrated as embodied in a clutch mechanism mounted on a shaft 10 which is provided with two annular shoulders 12 and 14 and is threaded at one end for reception of a nut 16.

A rotatable member 18 in the form of a pulley for transmitting power is mounted for free rotation on the shaft 10 with a ball bearing 20 interposed. The bearing 20 is retained within the member 18 by means of a shoulder 22 on a hub 23 of the latter and a snap ring 24 positioned in an annular recess 26 within the hub. The inner race of the bearing 20 is held in abutting relation with the shoulder 12 of the shaft 10 by means of a hub 25 affixed to the shaft 10 by means of a key 27. The hub 25 is provided with a flange 28 intermediate its length and to this flange a disc-like element or driving plate 30 is attached by four rivets 32. The nut 16 when tightened against the outer end of the hub 25 causes the inner end 29 thereof to abut the inner race of the bearing 20 and hold the latter in firm relation with the shoulder 12 of the shaft 10.

The rotatable power-transmitting member 18 preferably is so made as to have a drum structure or an inwardly facing cylindrical surface 34 integral therewith. This drum structure obviously may be made as a separate part without departing from the principles of the present invention.

Figure 5:
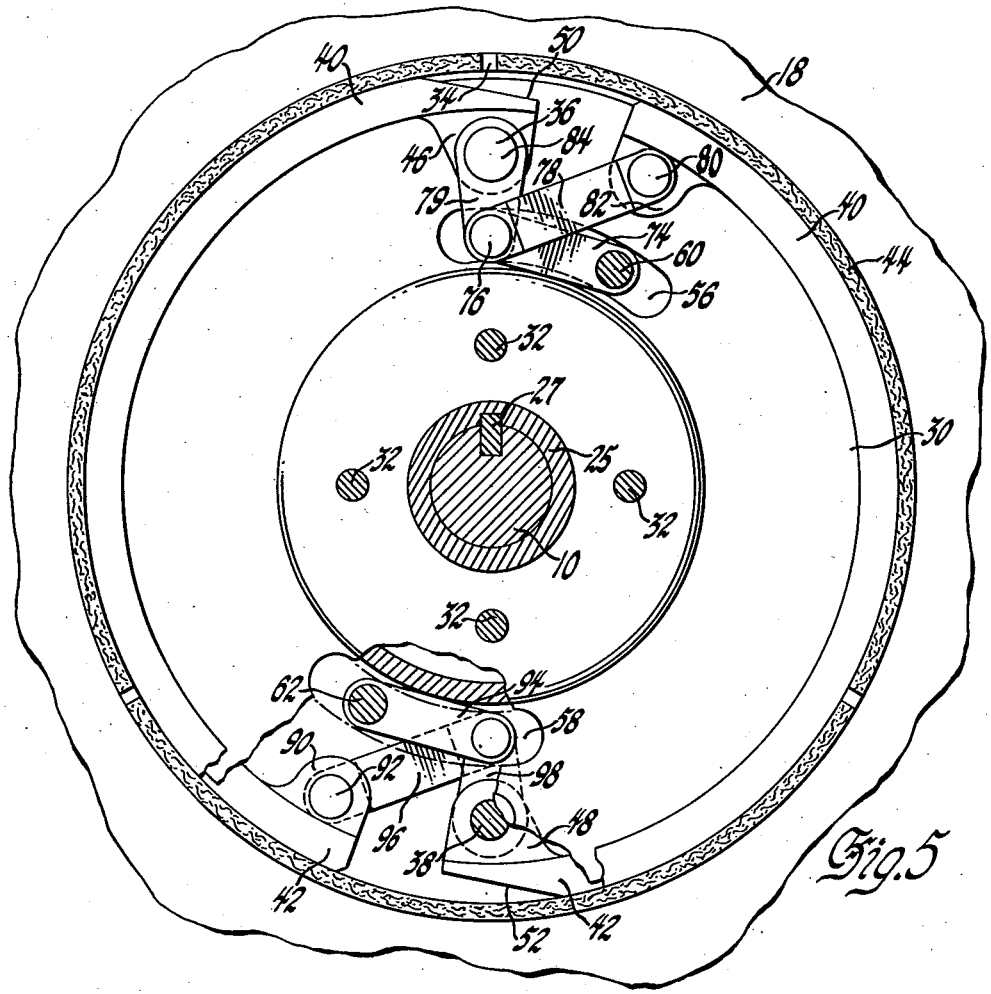
Fig. 5 is a sectional view taken along the line 5—5 of Fig. 3 with the parts arranged for clutch engagement.

The disc-like element or driving plate 30 is provided with two diagonally positioned pivot pins 36 (Figs. 3 and 5) and 38 (Fig. 5). As viewed in Fig. 3 the pivot pin 36 extends to the left from the plate 30 with a reduced portion 37 extending through the latter and peened over. It will be understood that the pin 38 extends in the opposite direction from the plate 30 and is attached thereto in a similar manner.

Clutch band means comprising two bands or shoes 40 and 42 in the form of open rings as well as friction lining 44 is mounted within the zone enclosed by the cylindrical surface 34. One end of the band or shoe 40 is provided with a lug 46 which is arranged to pivot on the pin 36. One end of the band or shoe 42 is likewise provided with a lug 48 which is adapted to pivot on the pin 38.

It will be noted that the shoes 40 and 42 at their ends adjacent the lugs 46 and 48 respectively are tapered as at 50 and 52 to promote smoother engagement of the lining 44 with the surface 34. Preferably the friction lining 44 is caused to float between the clutch bands and the surface 34 and is made in three sections.

The disc-like element or driving plate 30 is provided with two diagonally opposed and concentric slots 56 and 58. Through these slots are extended two pins 60 and 62 the exterior ends of which are rigidly affixed to a trip operating means partially in the form of a disc 64. This disc has a hub 66 (Fig. 3) formed integrally therewith and arranged to rotate on and in frictional engagement with the exterior of the hub 25. A toothed wheel 68 is rigidly affixed to the end of the hub 66 to rotate therewith and a split ring 70 is mounted within a groove 72 on the hub 25 to retain the plate 64 in its proper axial position.

The pin 60 extends through the slot 56 in the interest of dynamic balance but it is not essential that it does so. One end of a link 74 is pivoted to the pin 60 mid-length thereof, and the other end of the link 74 is pivoted by means of a pin 76 to one end of a link 78 and to one end of a short link 79. The other end of the link 78 is pivoted by means of a pin 80 to a lug 82 on one end of the band or shoe 40. It will be noted that the link 78 is broadly U-shaped at mid-length in order to clear the head 84 of the pin 36. The other end of the link 79 is journaled on the reduced portion 86 of the pin 36.

The band or shoe 42 is similar to the shoe 40 but is placed on the other side of the plate 30 and with its anchor point diagonally opposite. It is provided with a lug 90 which bears a pin 92. Links 94, 96 and 98 connect the pins 62, 92 and 38 as do the links 74, 78, and 79 with respect to pins 60, 80 and 36.

The shoes 40 and 42, with their anchoring points or pins 36 and 38 spaced 180 degrees apart for balance, are made with a free diameter greater than the installed diameter, i. e., the shoes are manufactured with a radius greater than the distance between the center line of the shaft 10 and the inner surface of the clutch lining 44 in the clutch assembly. Preferably, each band is cast as a continuous ring for machining purposes and the opening between the lug 46 and the lug 82 or the lug 48 and the lug 90 is cut from the ring after all machining is complete. If desired, a resilient steel strip reinforced at the linkage connections may be substituted for each cast band.

Brake means as generally indicated at 100 (Fig. 3) comprises a brake band 102, one end of which is affixed to a stub shaft 104 supported on a fixed or stationary supporting member 106. The inner side of the brake band 102 is fitted with frictional material or brake lining 107 and the other end thereof is affixed to a pin 108 held in a U-frame 110. One end of the U-frame 110 is enlarged at 112 and arranged to pivot on the pin 104 and also to carry an upwardly extending arm 114 and a side portion 116. The side portion 116 is outwardly flanged as at 118 to carry spring dogs 120 directly above the teeth 122 of the wheel 68. The arm 114 extends upwardly as stated and is in pivoted connection with a Bowden wire 124 which is sheathed in a flexible conduit 126 held on the support 106 by a clamping device 130 and leading to a convenient zone for control by an operator. The end of the arm 114 bears a projection 132 to which one end of a coil spring 134 is attached. The other end of the spring 134 is attached to a finger 136 integral with the fixed support 106.

Figure 6:
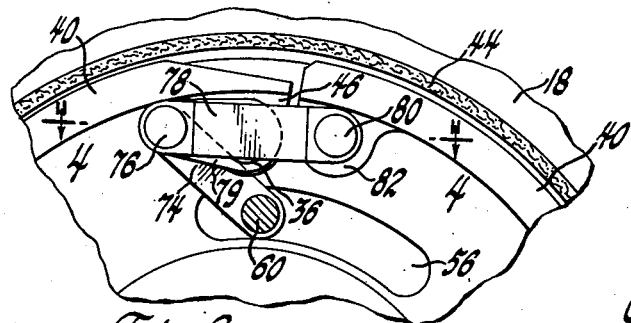
Fig. 6 is a sectional view of a portion of the clutch mechanism as shown in Fig. 5 but with the clutch disengaged.

In explanation of the operation of the clutch mechanism it will be understood that Figs. 2, 3 and 5 show the parts as positioned during release of the brake and engagement of the clutch, whereas Figs. 1, 4 and 6 show the parts in their positions assumed during the application of the brake and disengagement of the clutch.

Assuming that the shaft 10 is stationary and is to be driven in the direction of the arrow A (Fig. 1) and that the pulley or rotatable member 18 is being freely rotated by belts or a power means not shown, engagement of the clutch to rotate the shaft 10 is effected by manual actuation of the Bowden wire 124 with the aid of the tension in the spring 134 to rotate the arm 114 in a counterclockwise direction from its position as viewed in Fig. 1 to that shown in Fig. 2. This will cause the pin 108 to lower and the brake band 102 will loosen around the hub 66. Simultaneous with this action, the spring dogs 120 will engage the teeth 122 and these elements comprise a positive acting device to rotate the wheel 68 in the clockwise direction as viewed in Fig. 1. The secondary hub 66, being affixed to the wheel 68, will rotate therewith and the pins 60 and 62 will be rotated in a clockwise direction to their positions within the slots 56 and 58 as viewed in Fig. 5. Because of the action of the links in the toggle mechanisms connecting adjacent ends of each of the bands 40 and 42, the outer diameters of the latter will be increased because of the inherent tendency of the bands to expand to their free diameters from their maximum internally stressed or distorted condition with the result that the lining 44 will be compressed against the surface 34 and the clutch will be engaged. Pressure of the bands 40 and 42 against the friction material 44 is transmitted to the surface 34 with the result that the shaft 10 is caused to rotate with or be "picked up" by the pulley 18.

For disengaging the clutch, a pull on the Bowden wire 124 against the tension of the spring 134 will cause application of the brake and consequent retardation in motion of the disc 64 with respect to the disc-like element or plate 30. As a consequence, the pins 60 and 62 will move in a counter clockwise direction as viewed in Figs. 5 and 6 with respect to the plate 30. Because of the action of the toggle linkages, the opposite ends of each of the bands 40 and 42 will be drawn toward each other and the effective diameter of the shoes 40 and 42 will be reduced thereby disengaging the clutch. Fig. 6 illustrates the positions of the toggle links for band 40 when the clutch is disengaged.

In the drawing a spring 134 has been disclosed to aid in the operation of the control means or Bowden wire 124. This spring obviously may be dispensed with in certain installations.

It is to be noted that the action of the spring dogs 120 and the gear wheel 68 is one of very slight extent and the magnitude of force to be applied through the Bowden wire is very small. Actuation of the clutch is merely initiated by use of the control wire 124. Actual engagement of the clutch is effected by virtue of the tripping of the toggle mechanisms permitting the bands 40 and 42 to expand. The effect of the brake application is merely to neutralize to a slight extent the driving effect of the friction between the hubs 25 and 66 to retard rotation of the disc 64 in order to bring about disengagement.

It will be noted that the mechanism as drawn is limited to only one direction of rotation of the pulley 18 with respect to the shaft 10 as shown by the arrow A in Fig. 1. Suitable reversal of the parts would enable rotation in the opposite direction.

The three sections of friction material 44 are preferably made to float between the bands 40 and 42 and the surface 34 as previously indicated, but this friction material could be cemented to the shoes or to the drum and in either of the latter events the lining 44 should be preferably be divided annularly.

Fig. 3 shows the entire unit, except for the rigid support 106, mounted on the end of the shaft 10. It will be appreciated that the pulley 18 could be mounted on a stub or idler shaft independent of a second shaft to which the hub 25 could be keyed.

It is also to be noted that shaft 10, or whatever shaft is keyed to the hub 25, could serve as the driver and that the pulley 18 could serve as the driven element. In such an event, plate 30 would be rotated before the clutch is engaged. Application of the brake would then trip the toggle linkage mechanisms and the pulley 18 would be rotated or "picked up" by the shaft.

The construction of the unit is such that not only is it self-actuating but the pulley is capable of free wheeling with respect to the shaft 10 and production of the entire unit requires a minimum amount of machining.

I claim:

1. A clutch mechanism comprising a rotatable member, an element with a hub adapted to be fixed to a shaft for rotation therewith, clutch band means fixed to said element and positioned to engage said rotatable member, trip means including a disc journaled on said hub and connected to said clutch band means, said trip means disc being arranged to be rotated in one direction by frictional contact with said hub, means including a brake and a positive acting device arranged in operative relation with said trip operating means for controlling operation of the said clutch, and said positive acting device being effective in the opposite direction.

2. A clutch mechanism comprising a rotatable driving member, a driven shaft upon which said member is mounted for relative rotation, an element with a hub fixed to said shaft for rotation therewith, stressed clutch band means fixed to said element and positioned to engage said driving member by stress release, trip means including a toggle arrangement connected to said clutch band means to vary the stress therein, said trip means being in frictional contact with said hub to rotate with the latter and said shaft, and brake means arranged in operative relation with said trip means to disengage said clutch band means from said driving member.

3. A clutch mechanism comprising a pulley member with an internal drum portion, a shaft upon which said member is mounted, an element with the hub adapted to be fixed to said shaft for rotation therewith, expandable clutch band means fixed to said element and positioned to engage said drum portion upon expansion, trip means connected to said clutch band means, trip operating means in frictional contact with said hub to be rotated thereby and brake means arranged in operative applied position with said trip operating means to disengage said clutch band means.

4. A self-actuating clutch mechanism comprising a rotatable member having an inwardly directed cylindrical surface, a shaft upon which said rotatable member is freely mounted for rotation, an element with a hub adapted to be fixed to said shaft for rotation therewith, normally distorted and contracted clutch band means pivoted to said element and positioned to engage said cylindrical surface when partially released, trip means connected to said clutch band means, trip operating means in frictional contact with said hub to be rotated thereby, and brake means surrounding said shaft and in operative relation with said trip operating means for actuating said clutch band means.

5. A clutch mechanism comprising a rotatable member, an element with a hub adapted to be fixed to a shaft for rotation therewith, two clutch bands fixed to said element and positioned to engage said rotatable member, said element being interposed between said two clutch bands, trip means connected to said clutch bands and in frictional contact with said hub to be moved thereby, and brake means arranged in operative relation with said trip means to actuate said two clutch bands.

6. A clutch mechanism comprising a rotatable member, an element with a hub adapted to be fixed to a shaft for rotation therewith, two clutch bands pivoted at diagonally opposite points to said element and positioned to engage said rotatable member, said element being interposed between said two clutch bands, trip means connected to said clutch bands, trip operating means including a secondary hub in frictional contact with said first hub to be rotated in one direction thereby and brake means arranged in operative relation with said trip operating means to restrain rotation of said secondary hub for actuating said clutch bands about said pivot points to disengage said bands.

7. A clutch mechanism comprising a rotatable member, an element with a hub adapted to be fixed to a shaft for rotation therewith, clutch band means fixed to said element and positioned to engage said rotatable member, trip means connected to said clutch band means, trip operating means having a secondary hub in frictional contact with said first-mentioned hub to be rotated thereby, brake means arranged in operative relation with said trip operating means for actuating said clutch band means into non-engagement, and control means connected to said brake means to release the latter and cause said clutch band means to engage said rotatable member.

8. A self-actuating clutch mechanism comprising a rotatable member, an element with a hub adapted to be fixed to a shaft for rotation therewith, internally stressed and distorted clutch bands fixed to said element and positioned to engage said rotatable member when released, trip means connected to said clutch bands, trip operating means in frictional contact with said hub to be moved thereby, brake means arranged in operative relation with said trip operating means to actuate said clutch bands, and control means connected to said brake to apply the same and disengage the said clutch bands.

9. A clutch mechanism to be mounted on shafting, said mechanism comprising a rotatable power-transmitting member having an inwardly facing cylindrical surface, a disc-like element with a central hub adapted to be fixed to a shaft for rotation therewith, two contracted and distorted clutch bands fixed to said element and positioned frictionally to engage said rotatable member, trip operating means having a secondary hub in frictional contact with said first mentioned hub to be rotated thereby, trip means in the form of toggle linkages connecting said clutch bands to said trip operating means, brake means arranged in operative relation with said secondary hub for actuating said clutch bands through said toggle linkages, and means for alternately releasing said brake partially to release the contracted clutch bands and applying said brake to contract the clutch bands.

10. A clutch mechanism comprising a rotatable member, a shaft upon which said member is mounted, an element fixed to said shaft, clutch band means of distorted diameter pivotly fixed to said element for rotation with said shaft and element and positioned to engage said member, said clutch band means having a free diameter greater than the installed or distorted diameter, trip means connected to said clutch band means, means for operating said trip means in frictional contact with said element to rotate with the latter, and means for controlling motion of said trip operating means to actuate said clutch band means.

11. A clutch mechanism comprising a rotatable member, an element with a hub fixed to a shaft for rotation therewith, clutch band means fixed to said element and arranged for engagement with said member, trip means connected to said clutch band means consecutively to interrupt and establish said engagement with said member, positive acting means and brake means arranged in operative association with said trip means, and means connected to said positive acting means and brake means to actuate the same for causing said interruption and engagement respectively of said clutch band means with said member.

12. A self-actuating clutch mechanism comprising a rotatable member, an element with a hub fixed to a shaft for rotation therewith, internally stripped and distorted clutch band means fixed to said element and arranged upon partial release of said strip for engagement with said member, trip means connected to said clutch band means consecutively to interrupt and establish said engagement of the latter with said member, positive acting means and brake means arranged in operative association with said trip means, and means connected to said positive acting means and brake means respectively to actuate them for causing said interruption and engagement respectively of said clutch band means with said member.

13. A clutch mechanism comprising a rotatable member having a drum structure, a shaft upon which said member is mounted, a driving element with a first hub keyed to said shaft, clutch band means pivoted to said driving element and positioned during clutch engagement frictionally to act upon said drum structure, trip linkages connected to said clutch band means, disc means with a second hub in frictional engagement with said first hub and operatively connected with said trip linkages, brake means arranged in operative contactual relation with the said second hub to act thereon and thereby disengage said clutch band means through said linkages, and means for releasing said brake means and momentarily rotating said disc means to effect engagement of said clutch band means with said rotatable member through said trip linkages.

References Cited in the file of this patent

UNITED STATES PATENTS

| 661,117 | Dyer | Nov. 6, 1900 |
| 1,671,717 | Grundon | May 29, 1928 |
| 1,925,728 | Fundom | Sept. 5, 1933 |
| 2,230,339 | Shaw | Feb. 4, 1941 |